United States Patent
Feldman et al.

(10) Patent No.: US 11,553,016 B2
(45) Date of Patent: *Jan. 10, 2023

(54) CROSS NETWORK SHARING SYSTEM

(71) Applicant: T1V, Inc., Charlotte, NC (US)

(72) Inventors: Michael R. Feldman, Huntersville, NC (US); James E. Morris, Lake Wylie, SC (US)

(73) Assignee: T1V, INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,141

(22) Filed: Aug. 2, 2021

(65) Prior Publication Data
US 2021/0360043 A1    Nov. 18, 2021

Related U.S. Application Data

(63) Continuation of application No. 15/614,297, filed on Jun. 5, 2017, now Pat. No. 11,095,694.
(Continued)

(51) Int. Cl.
| | |
|---|---|
| *H04L 65/403* | (2022.01) |
| *H04L 65/1063* | (2022.01) |
| *H04L 9/40* | (2022.01) |
| *H04W 12/02* | (2009.01) |
| *H04L 67/141* | (2022.01) |
| *H04W 12/033* | (2021.01) |
| *H04L 65/61* | (2022.01) |
| *H04L 65/75* | (2022.01) |

(Continued)

(52) U.S. Cl.
CPC ........ *H04L 65/403* (2013.01); *H04L 63/0428* (2013.01); *H04L 65/1063* (2013.01); *H04L 65/61* (2022.05); *H04L 65/75* (2022.05); *H04L 67/141* (2013.01); *H04W 12/02* (2013.01); *H04W 12/033* (2021.01); *H04L 65/1069* (2013.01); *H04L 65/70* (2022.05)

(58) Field of Classification Search
CPC ............... H04L 65/403; H04L 63/0428; H04L 65/1063; H04L 65/4069; H04L 65/601; H04L 67/141; H04L 65/1069; H04L 65/607; H04W 12/033; H04W 12/02
USPC ....................................................... 709/205
See application file for complete search history.

(56) References Cited

U.S. PATENT DOCUMENTS

| | | |
|---|---|---|
| 2010/0107205 A1 | 4/2010 | Foti |
| 2012/0226817 A1 | 9/2012 | Woxblom et al. |

(Continued)

Primary Examiner — Jeffrey R Swearingen
(74) Attorney, Agent, or Firm — Xsensus LLP

(57) ABSTRACT

A system includes a common display, a display computer to run collaboration software connected to the common display that drives the common display, the display computer being on a first network, a first mobile device to run a sharing application and a streaming application, the first mobile device being on a second network, separate from the first network, the streaming application to convert a display of the mobile device into stream data, a control channel between the mobile device and the display computer, and a stream channel between the display computer and the mobile device. The mobile device sends stream data directly to the display computer, wherein the display computer is to display the stream data on the common display. The stream channel may be directly between the mobile device and the display computer or may be over a relay server.

20 Claims, 4 Drawing Sheets

Related U.S. Application Data

(60) Provisional application No. 62/345,204, filed on Jun. 3, 2016.

(51) Int. Cl.
*H04L 65/1069* (2022.01)
*H04L 65/70* (2022.01)

(56) References Cited

U.S. PATENT DOCUMENTS

| | | | |
|---|---|---|---|
| 2014/0240445 A1* | 8/2014 | Jaynes | H04N 21/4122 348/14.07 |
| 2015/0032809 A1 | 1/2015 | Xie et al. | |
| 2015/0358400 A1* | 12/2015 | Bartlett, II | H04L 63/126 709/201 |
| 2016/0226899 A1 | 8/2016 | Reddy et al. | |

* cited by examiner

CROSS NETWORK SHARING SYSTEM

CROSS-REFERENCE TO RELATED APPLICATIONS

The present application is a Continuation of U.S. application Ser. No. 15/614,297 filed on Jun. 5, 2017, which claims priority under 35 U.S.C. § 119(e) to U.S. Provisional Application No. 62/345,204, filed on Jun. 3, 2016, and entitled: "Cross Network Sharing System," each of which are incorporated herein by reference in its entirety.

BACKGROUND

Currently, devices may be shared on a same network or using a web-based device sharing meeting. Such meetings initially connect a host computer to a server in the cloud to initiate the video conference. Then the server in the cloud controls the connections for the meeting. For example, if a second user with a mobile device joins the meeting it requests to join the meeting from the server in the cloud. Once a connection between the second mobile device and the server is formed, the second mobile device may send a data stream to the server in the cloud. If it is encrypted data, the server in the cloud will decrypt the data. Any other computers that join the meeting can then access the data stream from the cloud server. The problem with this approach is that it can be very slow.

SUMMARY

One or more embodiments are directed to a system, including a common display, a display computer to run collaboration software connected to the common display that drives the common display, the display computer being on a first network, a first mobile device to run a sharing application and a streaming application, the first mobile device being on a second network, separate from the first network, the streaming application to convert a display of the mobile device into stream data, a control channel between the mobile device and the display computer, and a stream channel between the display computer and the mobile device and wherein the mobile device sends stream data directly to the display computer, wherein the display computer is to display the stream data on the common display.

The system may include a relay server in communication with the mobile device and the display computer, wherein, the sharing application on the mobile device is to send a key associated with the display computer to the relay server. The relay server may determine the associated display computer in the first network based on the key, and to establish the control channel.

The relay server may be remote.

The relay server may be on the first network and has a public address.

The first network may have a first public IP address, the second network may have a second public IP address, and the relay server may have a third public IP address, further including a router to connect the first network, the second network, and the relay server to the internet.

The relay server may use the key to determine the display computer's private IP address and the public IP address of the first network.

The sharing application may convert the display of the mobile device into stream data by digitizing image data associated with the display of the mobile device.

One or more embodiments are directed to a system, including a common display, a common display, a display computer to run collaboration software connected to the common display that drives the common display, the display computer being on a first network, a first mobile device to run a streaming application, the first mobile device being on the first network, the streaming application to convert a display of the first mobile device into stream data, a second mobile device to run a sharing application and the streaming application, the second mobile device being on a second network, separate from the first network, the streaming application to convert a display of the second mobile device into stream data, a control channel between the second mobile device and the display computer, a first stream channel between the display computer and the first mobile device, a second stream channel between the display computer and the second mobile device. The first and second mobile devices may send stream data to the display computer through corresponding stream channels. The second mobile device may send control data to the display computer, and the display computer is to display the stream data from the first and second mobile devices on the common display.

The first and second stream channels may directly connect the first and second mobile devices to the display computer.

The system may include a relay server in communication with the second mobile device and the display computer, wherein, the sharing application on the second mobile device is to send a key associated with the display computer to the relay server. The relay server may determine the associated display computer in the first network based on the key, and establish the control channel between the second mobile device and the display computer.

The second stream channel may be through the relay server.

The relay server may be remote.

One or more embodiments are directed to a system, including a common display, a display computer to run collaboration software connected to the common display that drives the common display, the display computer being on a first network, a first mobile device to run a sharing application and a streaming application, the first mobile device being on a second network, separate from the first network, the streaming application to convert a display of the mobile device into stream data, and a relay server in communication with the first mobile device and the display computer. When the first mobile device is to be connected to the display computer to stream content from the first mobile device to the display computer to be displayed on the common display, the sharing application on the first mobile device may send a key associated with the display computer to the relay server, and the relay server may determine the associated display computer in the first network based on the key, and establish a control channel. A stream channel between the display computer and the mobile device may supply the display computer with the stream data from the mobile device, wherein the display computer is to display the stream data on the common display.

The stream channel may be through the relay server or may be directly between the mobile device and the display computer.

One or more embodiments are directed to a system, including a common display, a display computer to run collaboration software connected to the common display that drives the common display, the display computer being on a first network, a first mobile device to run a sharing application and a streaming application, the first mobile device being on a second network, separate from the first network, the streaming application to convert a display of the mobile device into stream data, a control channel between the mobile device and the display computer, and a stream channel between the display computer and the mobile device. The mobile device may send encrypted stream data to the display computer, wherein the display computer is to decrypt the encrypted stream data and display the stream data on the common display.

The system may include a relay server in communication with the mobile device and the display computer, wherein, the sharing application on the mobile device is to send a key associated with the display computer to the relay server, and the relay server is to determine the associated display computer in the first network based on the key, and to establish the control channel.

The stream channel may be is through the relay server and the relay server may supply the encrypted stream data to the display computer.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. U.S. patent application Ser. No. 15/056,787, filed Feb. 29, 2016, and entitled "SYSTEM FOR CONNECTING A MOBILE DEVICE AND A COMMON DISPLAY" is hereby incorporated by reference in its entirety for all purposes.

Figure 1:
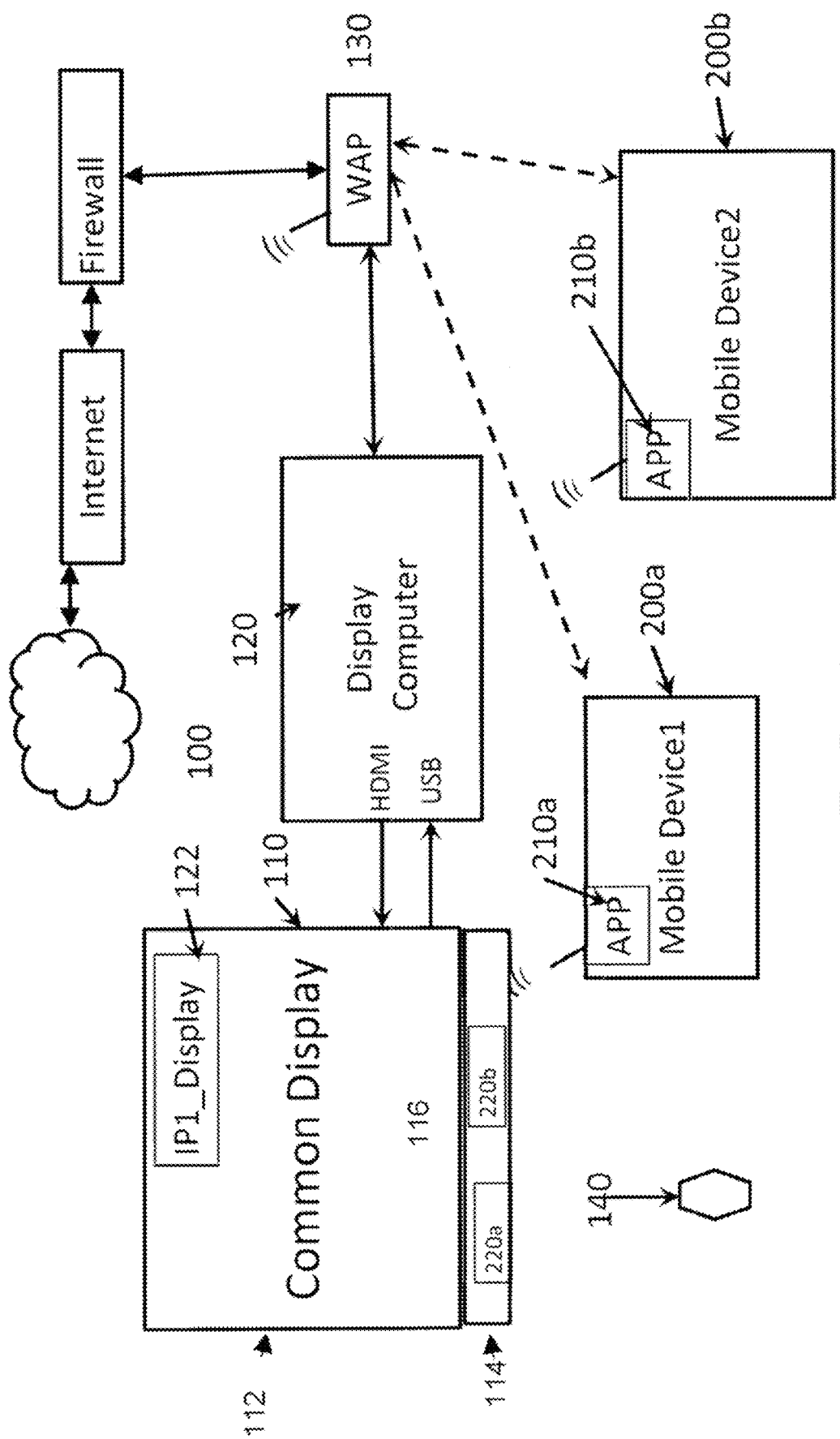
FIG. 1 illustrates a block diagram of a display system in accordance with an embodiment.

FIG. 1 illustrates a block diagram of a display system 100 interacting with one or more mobile devices 200a, 200b, and so forth. The display system 100 includes a Common Display 110, a Display Computer 120, and a wireless router 130 serving as a wireless access point (WAP), all interconnected. The Common Display 110 may be an LCD display, LED display, or other monitor that is capable of having an electronic video signal as an input and converting the input to a visual image.

The Common Display 110 may include a display region 112 and a tray region 114, e.g., below the display region. The Common Display 110 a touch sensor 116, e.g., overlaying an entirety of the Common Display 110, that it is sensitive to touch inputs including taps and gestures.

Information regarding a Machine Identifier 122 of the Display Computer 120 and the digital information to be displayed on the Common Display 110 may be sent from the Display Computer 120 to the Common Display 110. This digital information can be within windows or Mobile Device Windows (MDWs), e.g., editable windows, or on the entire screen of display region 112 of the Common Display 110. In addition, there may be windows displaying contents from mobile devices (MD) or other appropriate mobile device icons (MDI) 220a, 220b, e.g., a thumbnail of what is displayed on the mobile device, in the tray region 114 on the Common Display 110, e.g., at a lower region thereof. The tray region 114 may be a region on which the MDWs cannot be zoomed and pinched, annotated, and so forth, but may be dragged, tapped or tossed onto the display region 112, e.g., to open an MDW corresponding to the MDI, and/or to received MDWs from the display region 112 to transmit that MDW to the mobile device corresponding to the MDI.

Digital information from Mobile Device1 (200a) and Mobile Device2 (200b) is streamed from these Mobile Devices to the Display Computer 120 through the network. In FIG. 1, digital information is streamed from the mobile devices through the WAP 130 to the Display Computer 120. This streaming data may then be displayed in the Mobile Device Windows (MDW) (see FIG. 3) on the Common Display 110.

Typically, the data streamed from the Mobile Device (200a and/or 200b) is a video signal that is the same as the signal displayed on the Mobile Device. This streaming data will be referred to as a Mobile Devices Data Stream (MDDS). A MDDS is typically displayed within a MDW (see FIG. 3) in the display region 112 on the Common Display 110. Within or adjacent this MDQ, there may also be displayed an identifier associated with the Mobile Device, e.g, the name of the MDDS, a name associated with the corresponding Mobile Device, the Mobile Device's owner, and so forth.

If the mobile device 200a is running a Mac® operating system or an Iphone® operation system (iOS), then the user can use Airplay® to locate the Display Computer 120 that is configured as an Airplay® receiver. Airplay® is a video mirroring capability built in to Mac® OS and iOS. Using Airplay® to locate Airplay® receivers, the user can then view any devices on the network that are configured to receive Airplay® inputs, typically just Apple TV®s.

However, in accordance with an embodiment, the display computer 120 may include and run software, firmware, and/or hardware that acts as a video mirroring receiver. Then, when a user gets on the wireless network and searches for Airplay® receivers, the name of the display computer 120 will appear as an option to stream video within Airplay®. Once connected, the entire contents of the mobile device 200a may be streamed to the display computer 120.

However, Airplay® employs a Bonjour® network protocol. Some companies block Bonjour® protocol. Further, Bonjour® broadcasts will not travel across sub-networks. Finally, if the mobile device is using an operating system other than Mac® or iOS, Airplay® is not an option.

Therefore, in accordance with an embodiment, a user of a mobile device may download a sharing application 210a, 210b thereon to assist in connecting to and sharing content on the display computer 120 wirelessly, e.g., an AirConnect$^{WP}$ application by T1V. Instructions for downloading the sharing application 210a, 210b may be readily viewable, e.g., on or adjacent the common display 110, or a region to be scanned, e.g., a barcode, quick response (QR) code, and so forth, using a mobile device QR, so that once scanned, the sharing application 210a, 210b could be downloaded. Once the sharing application 210a, 210b is downloaded, then a user can launch the sharing application 210a, 210b and then enter the Machine Identifier 122 associated common display 110. The Machine Identifier 122 may by an IP address or other alphanumeric code associated with the Display Computer 120. The Machine Identifier 122 may be simply displayed on the Common Display 110, in which case the user of the sharing application 210a, 210b may simply enter the Machine Identifier 122 when prompted by the sharing application 210a, 210b on their Mobile Device. Alternatively, the Machine Identifier 122 may be automatically transferred to the Mobile Device either by displaying a QR code on the Common Display 110 or by transmitting through bluetooth or wireless communication.

For example, a low energy bluetooth beacon (CD-Beacon) 140, may be placed near the Common Display 110. This CD-Beacon 140 may transmit an identification number, e.g., a unique universal identification number (UUID). The sharing application 210a, 210b can detect this UUID and send this information to a cloud server. The cloud server can store a lookup table with each CD-Beacon and the associated Machine Identifier 122 for each Display Computer 120.

Once the Machine Identifier 122 is entered, the sharing application 210a, 210b may then use the Machine Identifier 122 to connect the Mobile Device directly to the display computer 120. As used herein, "direct connection" is to mean Once launched, the sharing application 210a, 210b may display a list of locally stored names and/or recently used connections on the mobile device. The Common Display 110 may also display the name or Machine Identifier 122 of the Display Computer 120 that it is connected to and/or the name of the Common Display 110 or Display Computer 120 may be posted near the Common Display 110. If the name associated with the Common Display 110 is not listed in the sharing application 210a, 210b, the user may type a Machine Identifier 122 that may be continuously displayed on or near the common display 110 to add the computer display 120 to the list of FIG. 2. The Machine Identifier 122 may be, e.g., name of the computer (host name), a universally unique identifier (UUID), and so forth.

Figure 2:
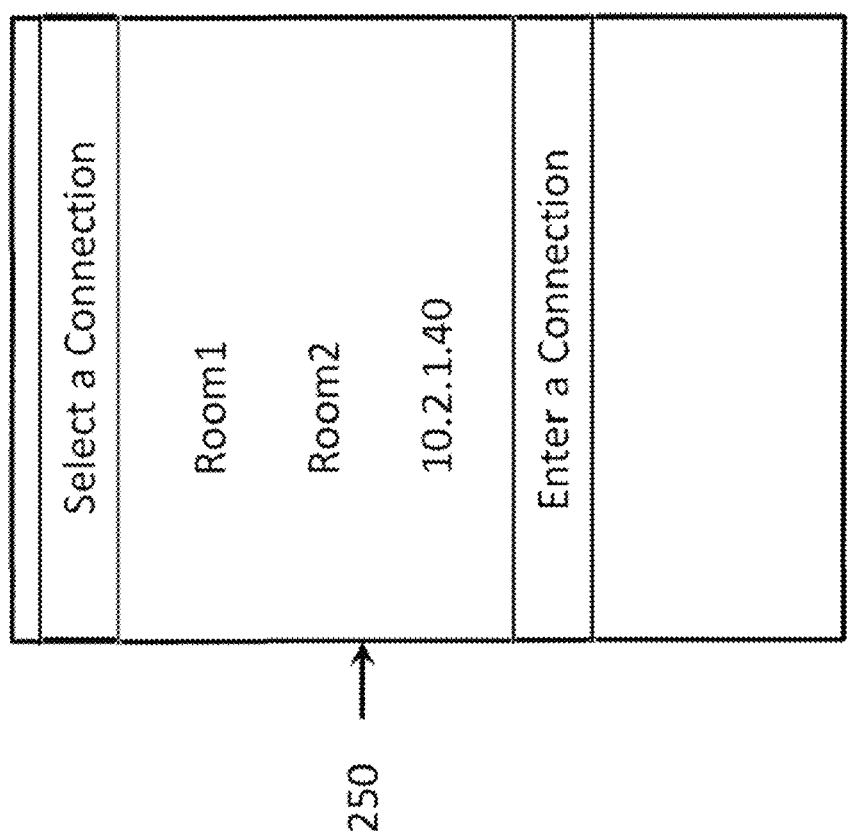
FIG. 2 illustrates an example of a screen that may appear when using the sharing application.

An example of a screen 250 that may appear when using the sharing application 210a, 210b is shown in FIG. 2. Here, a user would be prompted to select which display to be connected with. These options may include a name of a room in which the common display 110 is located, a nickname for the common display that is visually apparent, the machine identifier of the common display that is visually apparent, and so forth. The screen 250 for selection may look the same regardless of the operating system of the mobile device running the sharing application 210a, 210b.

There are two modes of operation for establishing connections for screen mirroring from a Mobile Device to a Display Computer, a first mode in which the Display Computer and the Mobile Device are on a same network, including subnetworks, e.g., a DirectMode$^{WP}$ mirroring by T1V$^{WP}$, and second mode, in which the Display Computer and the Mobile Device are on different networks, e.g., a WorldMode$^{WP}$ mirroring by T1V$^{WP}$. In the first mode, the mobile device must have a route on the network to talk directly to the Display Computer 120. In this manner, the user can type in the IP address of the Display Computer or the name of the Display Computer or machine identifier that returns the IP address of the Display Computer. In first mode, the IP address of the Display Computer is sufficient in itself to establish the connection.

In some situations this is not possible, typically due to the network architecture or security constraints placed on the network. The following embodiments are directed to handling such situations using the second mode of operation. In particular, by using an IP address to identify the Display Computer 120, if the Mobile Device is connected to a different network, e.g., a public or guest network, than the network on which Display Computer 120 is located, e.g., a private or an internal network, then the IP address will not allow the Mobile Device to talk to the Display Computer 120.

Typically a private network has only one or a few public IP addresses that are visible to the internet (cloud). Within the private network there are then typically hundreds or thousands of IP addresses that are not visible to the internet (cloud). Therefore, if there is a mobile device outside of a private network and the Display Computer is on one of the hundreds/thousands of IP addresses not visible to the cloud, then a mobile device outside of the private network cannot connect to a Display Computer inside a private network, using the first mode.

Typically, the Display Computer 120 is on a private, internal network. Typically, companies set-up an internal private network for employees and a separate private guest network for visitors. These networks are intentionally separated so that visitors cannot get access to internal company data.

Figure 3:
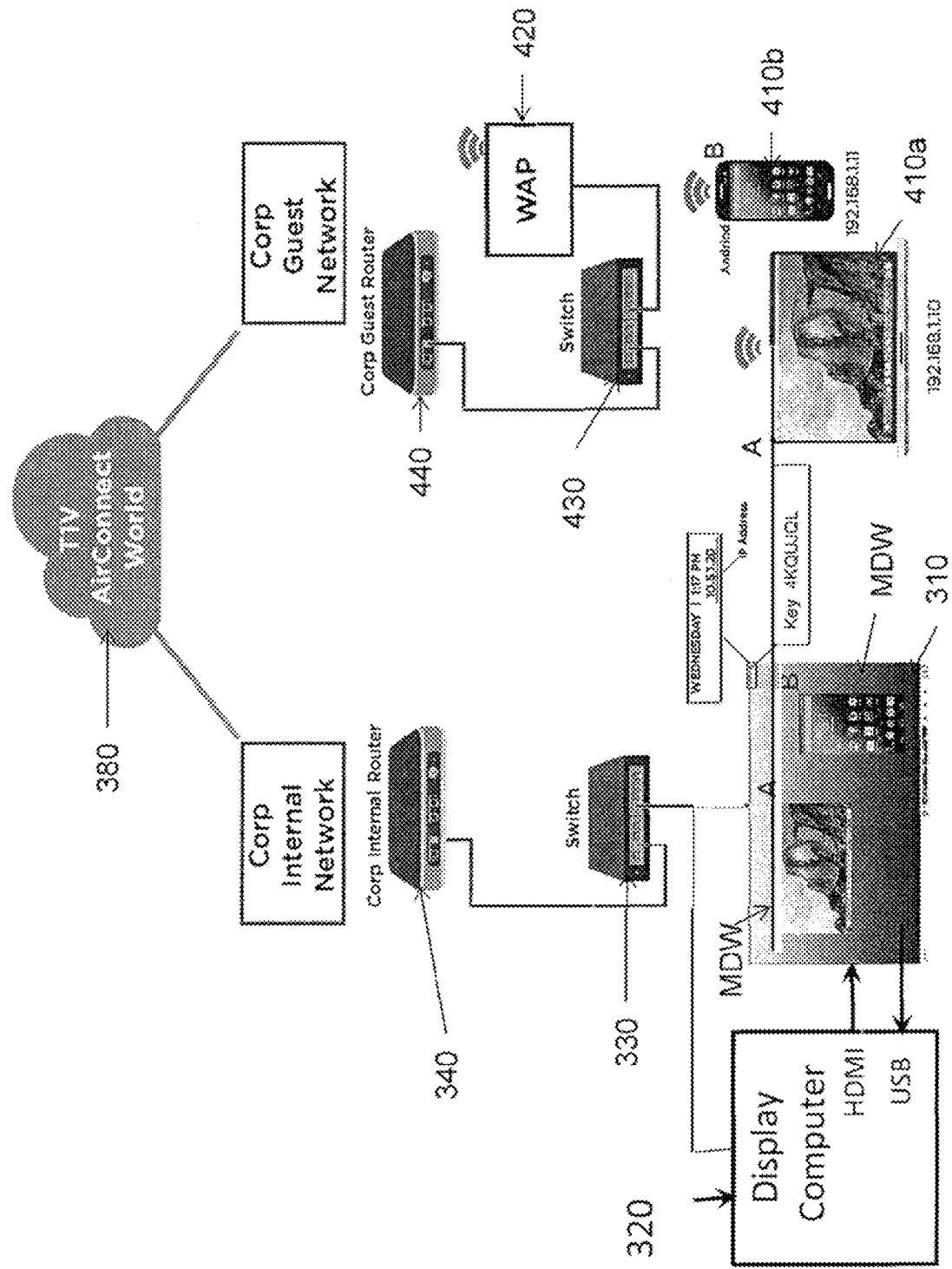
FIG. 3 illustrates a block diagram of a display system in accordance with an embodiment.

In order to overcome these issues, as illustrated in FIG. 3, a Common Display 310 is connected to a Display Computer 320 running collaboration software that enables multiple users to stream, share, view, and manipulate content from computers, laptop computers, tablet computers, cellular telephones and other mobile computing devices over WiFi or Ethernet networks to a computer connected to an electronic display panel, flat panel display, liquid crystal display, monitor, projector, display wall, or display table, e.g., a computer running ThinkHub$^{WP}$ application by T1V$^{WP}$. The video output from the Display Computer 320 is displayed on the Common Display 310. In addition to the functionalities noted above in connection to FIGS. 1 and 2, an extra computer is used to bridge between mobile devices and Display Computer 320. As used herein, this extra computer will be referred to a Relay Server 380, e.g., relay server running an AirConnect$^{WP}$ application by T1V$^{WP}$.

Figure 4:
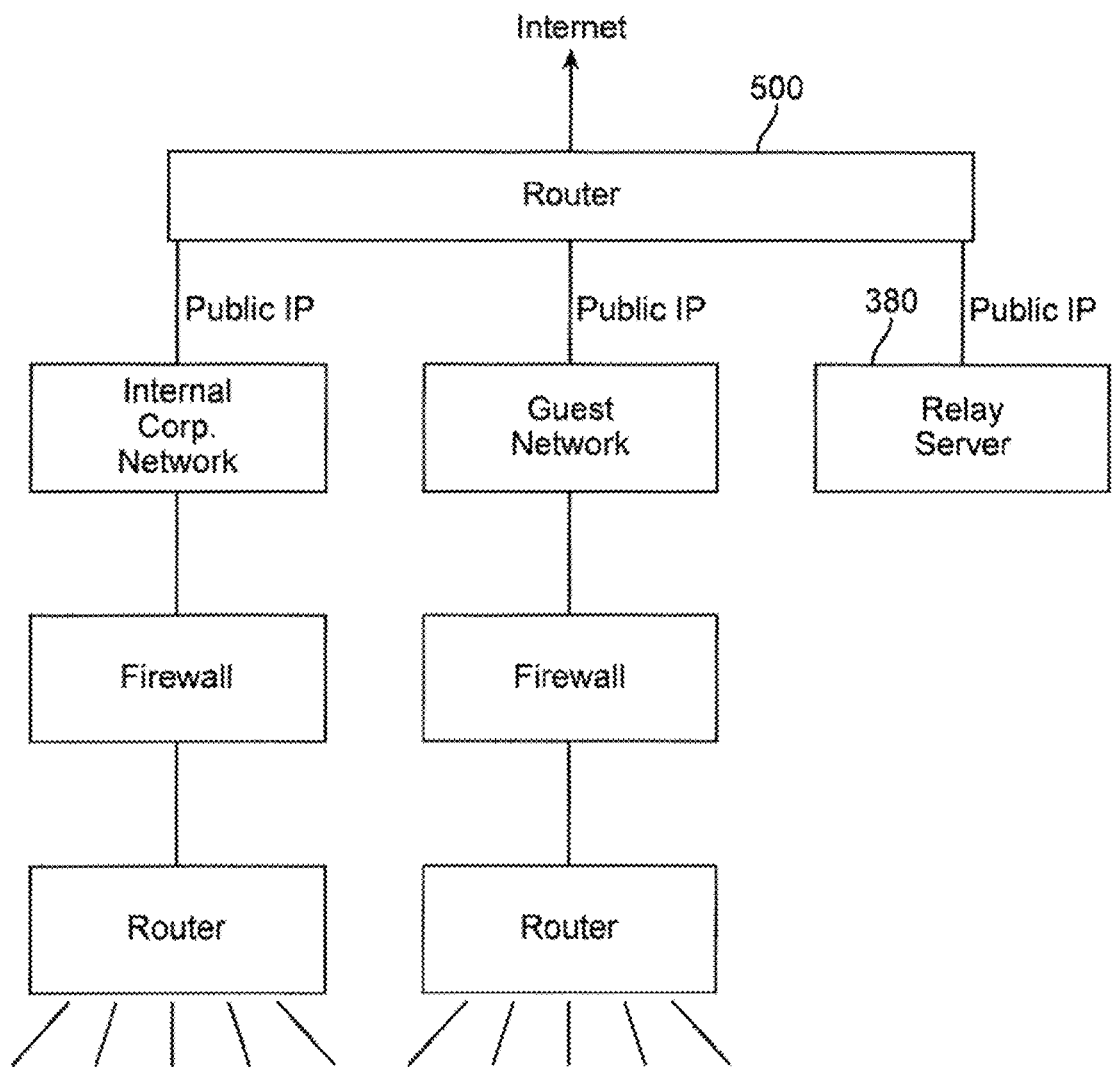
FIG. 4 illustrates a block diagram of a display system in accordance with an embodiment.

In the particular example illustrated in FIG. 3, it is assumed for ease of explanation that the Display Computer 320 is part of a corporate internal network and that Mobile Devices 410a, 410b to connect thereto is on a corporate guest network. However, both the Display Computer 320 and mobile device 410a, 410b could be on private networks, neither of which may be a corporate network. Further, in FIG. 3, the relay server 380 is a server in the cloud, i.e., a remote server, but it could be an on-premise server, as shown in FIG. 4. In either scenario, i.e., whether in the cloud or on-premise, the relay server 380 may have its own unique public IP address.

The Display Computer 320 may be connected to the internet via a switch 330 and a corporate internal router 340. Mobile devices 410a, 410b may connect to a WAP 420, which, in turn connects them to the internet via a switch 430 and a corporate guest router 440. The mobile devices may be on the same network, e.g., a public network, or may be on different networks, e.g., different public networks, different private networks, and so forth.

In the second mode, the relay server 380 is used to bridge between mobile devices 410A, 410B and Display Computer 320. In the second mode embodiment shown in FIG. 3 for the mobile devices and Display Computer 320 to communicate, they each need to establish an outbound connection to the relay server 380. When the Display Computer 320 starts up or at some predetermined time or interval, the Display Computer 320 creates a new key and registers the key with the Relay Server 380. When a user of a mobile device 410a, 410b wants to use the second mode, a user first starts up the sharing application on their mobile device and enters the key into the sharing application. The key may be displayed on the Common Display or may be provided to the user of the mobile device in various manners. The sharing application will then send the key to the Relay Server 380 and the Relay Server 380 will determine which Display Computer 320 is associated with that key. In this way both mobile devices and Display computers may connect to a single Relay Server thereby establishing a unique connection for each device (mobile devices and Display computer devices). For each Display Computer, when it connects to the Relay Server, it will designate that it is a Display Computer and it will send its associated key. The Relay Server will then know that the corresponding connection is from a Display Computer and associate the corresponding key with that connection. Then when a mobile device connects to the Relay server it will tell it that it is a Mobile device and that it requests to join a session with a particular key. Then the Relay Server may then route data received from the mobile device to the connection for the correct Display Computer. If this data is control data then is this is referred to as the control channel.

Alternatively, the Relay server 380 may use the key to determine the Display Computer's private IP address and the public IP address. The Relay Server 380 then instructs the Mobile device and the Display Computer 320 to attempt to make direct connections to each other.

Typically, a key is generated once per day and the password is generated once per hour. When the key is generated more frequently, no password may be required. While the key in FIG. 3 is illustrated as an alphanumeric string, the term key is used herein in its general sense and other information may be used to identify the Display Computer.

In this second mode of operation, using Airplay® alone is not sufficient. In other words, a mobile device using a Mac® or iOS operating system will now need to download an application allowing the mobile device to connect to the Display Computer 320 on the other network, e.g., the AirConnect$^{WP}$ app. The application for these operating systems, or any system with its own streaming application, e.g., an application that digitizes and converts a display of the mobile device into stream data, may only assist in connecting the Mobile Device to the Display Computer 320 wirelessly, i.e., establishing the control channel. Once the control channel has been established, the native streaming application may be employed. In other words, the streaming application and the sharing application may be separate stand alone applications or may be a single application.

Once the control channel is established, the sharing application digitizes the display of the Mobile Device and converts the digitized display into a video stream to be sent via a stream channel to the Display Computer 320. This stream channel could be routed through the Relay Server in the same manner as the control channel. For example, the video stream may be encrypted by the Mobile Device and transferred via the stream channel through the Relay Server without decryption, and then may be decrypted by the Display Computer 320. In other words, there is no need for the Relay Server to decrypt the data sent over the stream channel or process it in any way.

Alternatively, a stream channel could be directly established between the mobile device and the Display Computer, while the control channel would still be through the Relay Server 380. For example, if one of the networks was a public network, then the stream channel could be between the mobile device and the Display Computer 320. The Display Computer and the Mobile Device communicate over the control channel to establish the optimum method to set-up the stream channel.

If both the Display Computer 320 and a mobile device are on the same network, the sharing application may set-up a direct connection, i.e., may operate in the first mode. If one of the Display Computer 320 and a mobile device was on a public network, the sharing application may set-up a direct connection for the stream channel, although requiring the Relay Server 380 for establishing the control channel. If both the Display Computer 320 and a mobile device are on different private networks and one supports UPnP (Universal Plug and Play) the sharing application may set up a direct connection, e.g., for the stream channel while using the Relay Server 380 for the control channel. If the sharing application can't set up a direct connection between the two devices, then the sharing application may establish a channel through the Relay Server 380. The connection through the Relay Server 380 may always be used, but then speed would be reduced, so other connection routes may be employed when available, e.g., for the stream channel.

As noted above, FIG. 4 illustrates an embodiment in which the relay server 380 may be a on-premise server. As shown therein, outside of firewalls of the first, e.g., corporate internal network, having a first public IP address, and the second network, e.g., a guest network, having a second public IP address, and the Relay Server 380 having a third public IP address may all be connected to a router 500, which then may connect these to the internet.

By way of summation and review, in accordance with embodiments, mobile devices on different networks may establish a communication channel therebetween to stream data to a common display. Embodiments provide a direct connection from mobile devices to the host computer in a local room in order to have a higher performance meeting, e.g. higher frame rates and lower latency.

Embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of this disclosure.

The methods and processes described herein may be performed by code or instructions to be executed by a computer, processor, manager, or controller. Because the algorithms that form the basis of the methods (or operations of the computer, processor, or controller) are described in detail, the code or instructions for implementing the operations of the method embodiments may transform the computer, processor, or controller into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, or controller which is to execute the code or instructions for performing the method embodiments described herein.

Example embodiments have been disclosed herein, and although specific terms are employed, they are used and are to be interpreted in a generic and descriptive sense only and not for purpose of limitation. For example, while mobile device have been used as examples of remote devices, other fixed remote devices may employ the sharing and streaming applications described herein. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A system, comprising:
a common display;
a display computer to run collaboration software connected to the common display that drives the common display, the display computer being on a first network;
a mobile computer to run a sharing application and a streaming application, the mobile computer being on a second network, separated from the first network by a firewall, the streaming application to convert a display of the mobile computer into stream data;
a control channel between the mobile computer and the display computer, the control channel being established when specific authentication information associated with the display computer is provided to a user of the mobile computer, the user of the mobile computer enters the specific authentication information, and the entered specific authentication information matches that provided by the display computer; and
a stream channel between the display computer and the mobile computer, wherein
the mobile computer sends stream data to the display computer, wherein the display computer is to display the stream data on the common display, and
the display computer sends stream data displayed on the display computer directly to the mobile computer.

2. The system of claim 1, further comprising relay server in communication with the mobile computer and the display computer, the relay server being outside the firewall, wherein, the sharing application on the mobile computer is to send the specific authentication information associated with the display computer to the relay server, and the relay server is:
to determine the associated display computer in the first network based on the specific authentication information, and
to establish the control channel.

3. The system of claim 2, wherein the relay server is configured to establish a two-way communication channel between the display computer and the mobile computer outside of the firewall on condition that the display computer and the mobile computer both provide the relay server with the same specific authentication information.

4. The system of claim 2, wherein the relay server is remote.

5. The system of claim 2, wherein the relay server is on the first network and has a public address.

6. The system of claim 2, wherein the first network has a first public IP address, the second network has a second public IP address, and the relay server has a third public IP address, further comprising a router to connect the first network, the second network, and the relay server to the internet.

7. The system of claim 2, wherein the relay server uses the authentication information to determine the display computer's private IP address and the public IP address of the first network.

8. The system of claim 1, wherein the sharing application converts the display of the mobile computer into stream data by digitizing image data associated with the display of the mobile computer.

9. The system of claim 1, wherein the specific authentication information is a specific key associated with the display computer.

10. The system of claim 1, wherein the mobile computer sends encrypted stream data to the display computer and the display computer is to decrypt the encrypted stream data and display the stream data on the common display.

11. The system of claim 1, further comprising:
another mobile device on the first network, the another mobile device communicating directly with the display computer.

12. A system, comprising:
a common display;
a display computer to run collaboration software connected to the common display that drives the common display, the display computer being on a first network;
a first mobile computer to run a streaming application, the first mobile computer being on the first network, the streaming application to convert a display of the first mobile computer into first stream data;
a second mobile computer to run a sharing application and the streaming application, the second mobile computer being on a second network, separated from the first network by a first firewall, the streaming application to convert a display of the second mobile computer into second stream data;
a control channel between the second mobile computer and the display computer, the control channel being established when specific authentication information associated with the display computer is provided to a user of the second mobile computer, the user of the second mobile computer enters the specific authentication information, and the entered authentication information matches that associated with the display computer;
a first stream channel between the display computer and the first mobile computer; and
a second stream channel between the display computer and the second mobile computer, wherein
the first and second mobile computer send stream data to the display computer through corresponding stream channels, the second mobile computer sends control data to the display computer, the display computer is to send first stream data directly to the second mobile computer, and the display computer is to display the stream data from the first and second mobile computers on the common display.

13. The system of claim 12, wherein the first and second stream channels directly connect the first and second mobile computers to the display computer.

14. The system of claim 12, further comprising:

a relay server in communication with the mobile computer and the display computer, the relay server being outside the first firewall, wherein, the sharing application on the mobile computer is to send the specific authentication information associated with the display computer to the relay server, and the relay server is:

to determine the associated display computer in the first network based on the specific authentication information, and to establish the control channel.

15. The system of claim 14, wherein the second stream channel is through the relay server.

16. The system of claim 14, wherein the relay server is remote.

17. The system of claim 14, wherein the relay server is configured to establish a two-way communication channel between the display computer and the mobile computer outside of the firewall on condition that the display computer and the mobile computer both provide the relay server with the same specific authentication information.

18. The system of claim 14, wherein the first network has a first public IP address, the second network has a second public IP address, and the relay server has a third public IP address, further comprising a router to connect the first network, the second network, and the relay server to the internet.

19. The system of claim 14, wherein the first network has a first public IP address, the second network has a second public IP address, and the relay server has a third public IP address, further comprising a router to connect the first network, the second network, and the relay server to the internet.

20. The system of claim 12, wherein the mobile computer sends encrypted stream data to the display computer and the display computer is to decrypt the encrypted stream data and display the stream data on the common display.

* * * * *